(12) United States Patent
Hegde et al.

(10) Patent No.: US 11,709,815 B2
(45) Date of Patent: Jul. 25, 2023

(54) RETRIEVING INDEX DATA FROM AN OBJECT STORAGE SYSTEM

(71) Applicant: International Business Machines Corporation, Armonk, NY (US)

(72) Inventors: Harsha Hegde, Buffalo Grove, IL (US); Andrew D. Baptist, Mt. Pleasant, WI (US); Amit H. Lamba, Buffalo Grove, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 16/511,287

(22) Filed: Jul. 15, 2019

(65) Prior Publication Data

US 2021/0019298 A1    Jan. 21, 2021

(51) Int. Cl.
*G06F 16/22* (2019.01)
*G06F 16/23* (2019.01)

(52) U.S. Cl.
CPC ...... *G06F 16/2272* (2019.01); *G06F 16/2379* (2019.01)

(58) Field of Classification Search
None
See application file for complete search history.

(56) References Cited

U.S. PATENT DOCUMENTS

| 10,235,374 B2 | 3/2019 | Androulaki et al. |
| 2010/0017800 A1* | 1/2010 | Dow ............ G06F 9/4856 718/1 |
| 2014/0067758 A1 | 3/2014 | Boldyrev et al. |
| 2015/0161116 A1* | 6/2015 | Hubinette .......... G06F 16/93 707/741 |
| 2015/0347949 A1* | 12/2015 | Dwyer .......... G06Q 10/06393 705/7.39 |
| 2017/0123911 A1* | 5/2017 | Dhuse ............ G06F 11/1092 |
| 2017/0300538 A1* | 10/2017 | Seuss ............ G06F 16/2272 |
| 2018/0113651 A1* | 4/2018 | Leggette ............ G06F 3/064 |

(Continued)

OTHER PUBLICATIONS

Tanganelli, et al.; Edge-centric distributed discovery and access in the internet of things; IEEE Internet of Things Journal; Feb. 2018; pp. 425-438; vol. 5, Iss. 1.

(Continued)

*Primary Examiner* — Kris E Mackes
*Assistant Examiner* — Soheila (Gina) Davanlou
(74) *Attorney, Agent, or Firm* — Randy E. Tejeda; Andrew D. Wright; Calderon Safran & Cole P.C.

(57) ABSTRACT

A method for execution by a processing system includes determining to retrieve index data for a set of objects stored by an object storage system. An index type is selected from a plurality of index. A request message indicating a request for the index data of one of a plurality of indices stored by the object storage system corresponding to the index type is generated, and the request message is transmitted to the object storage system. The index data for the set of objects is received in a response message from the object storage system. The index data includes a plurality of pairs that each include a key and a value, where the keys correspond to the index type, and where the value of each pair includes metadata of one of the set of objects. The index data is stored in local memory in response to receiving the index data.

20 Claims, 12 Drawing Sheets

(56) References Cited

U.S. PATENT DOCUMENTS

2018/0150489 A1* 5/2018 Yamazaki ............. G06F 3/0638
2019/0274112 A1* 9/2019 Kleinbeck ............. H04W 64/00
2020/0341961 A1* 10/2020 Gong ................. G06F 16/2272

OTHER PUBLICATIONS

Zhang; Efficient and Scalable Metadata Access for Distributed Applications from Edge to the Cloud; PhD diss.; State University of New York at Buffalo; 170 pgs; Jan. 24, 2019.

* cited by examiner

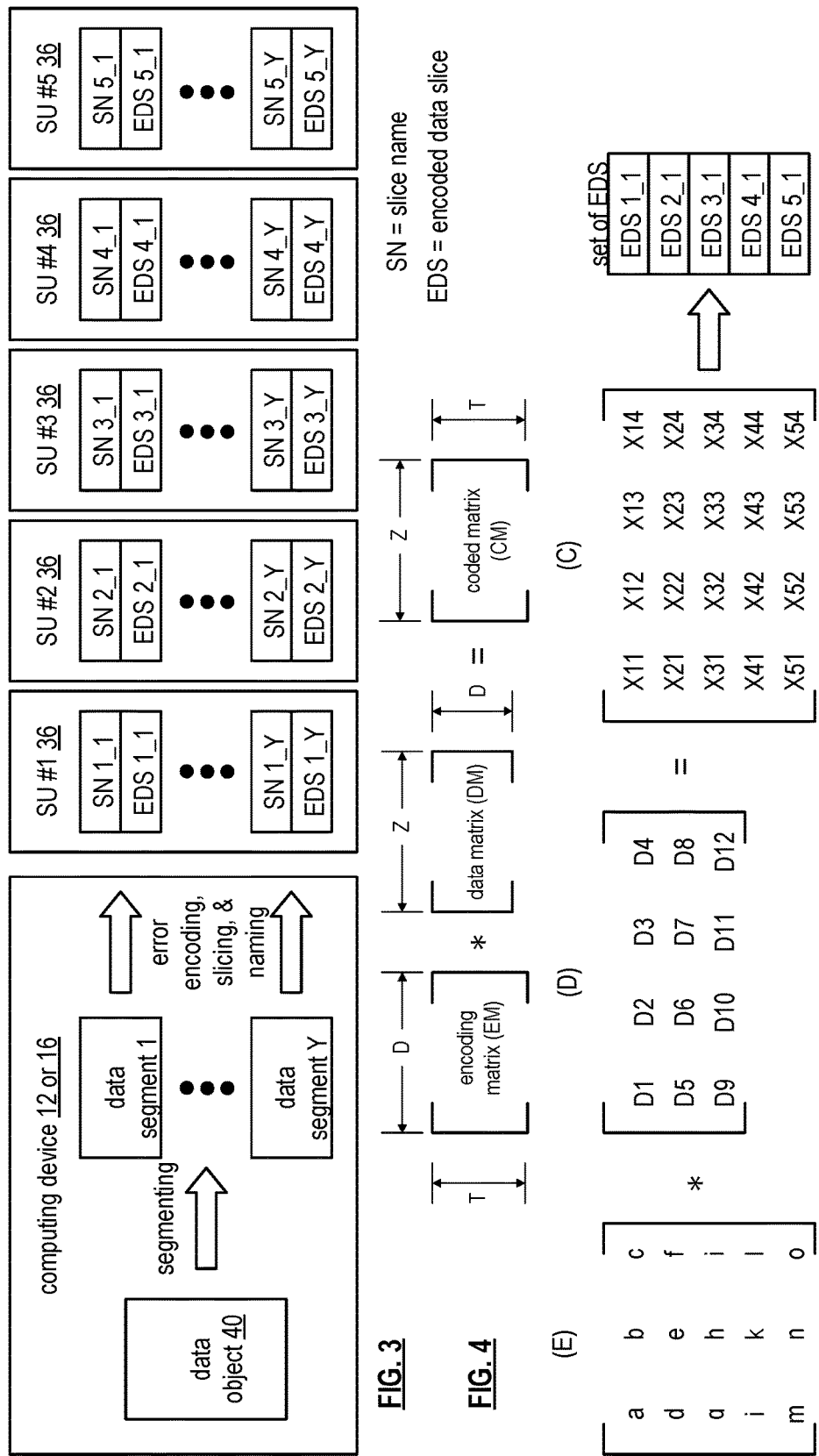

cache memory 914

| keys: | index 1: values: | | | |
|---|---|---|---|---|
| object 1 name | object 1 metadata 1_1 | ••• | object 1 metadata 1_x | |
| object 2 name | object 2 metadata 1_1 | ••• | object 2 metadata 1_x | |
| ••• | ••• | | ••• | |
| object p name | object p metadata 1_1 | ••• | object p metadata 1_x | |

| keys: | index 2: values: | | | |
|---|---|---|---|---|
| object 1 type | object 1 metadata 2_1 | ••• | object 1 metadata 2_y | |
| object 2 type | object 2 metadata 2_1 | ••• | object 2 metadata 2_y | |
| ••• | ••• | | ••• | |
| object p type | object p metadata 2_1 | ••• | object p metadata 2_y | |

•••

| keys: | index j: values: | | | |
|---|---|---|---|---|
| object 1 key_j | object 1 metadata j_1 | ••• | object 1 metadata j_z | |
| object 2 key_j | object 2 metadata j_1 | ••• | object 2 metadata j_z | |
| ••• | ••• | | ••• | |
| object q key_j | object p metadata j_1 | ••• | object p metadata j_z | |

FIG 9C

RETRIEVING INDEX DATA FROM AN OBJECT STORAGE SYSTEM

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9C is a schematic block diagram of an example embodiment of a plurality of indices stored in a cache memory of an edge node in accordance with the present invention;

DETAILED DESCRIPTION OF THE INVENTION

Figure 1:
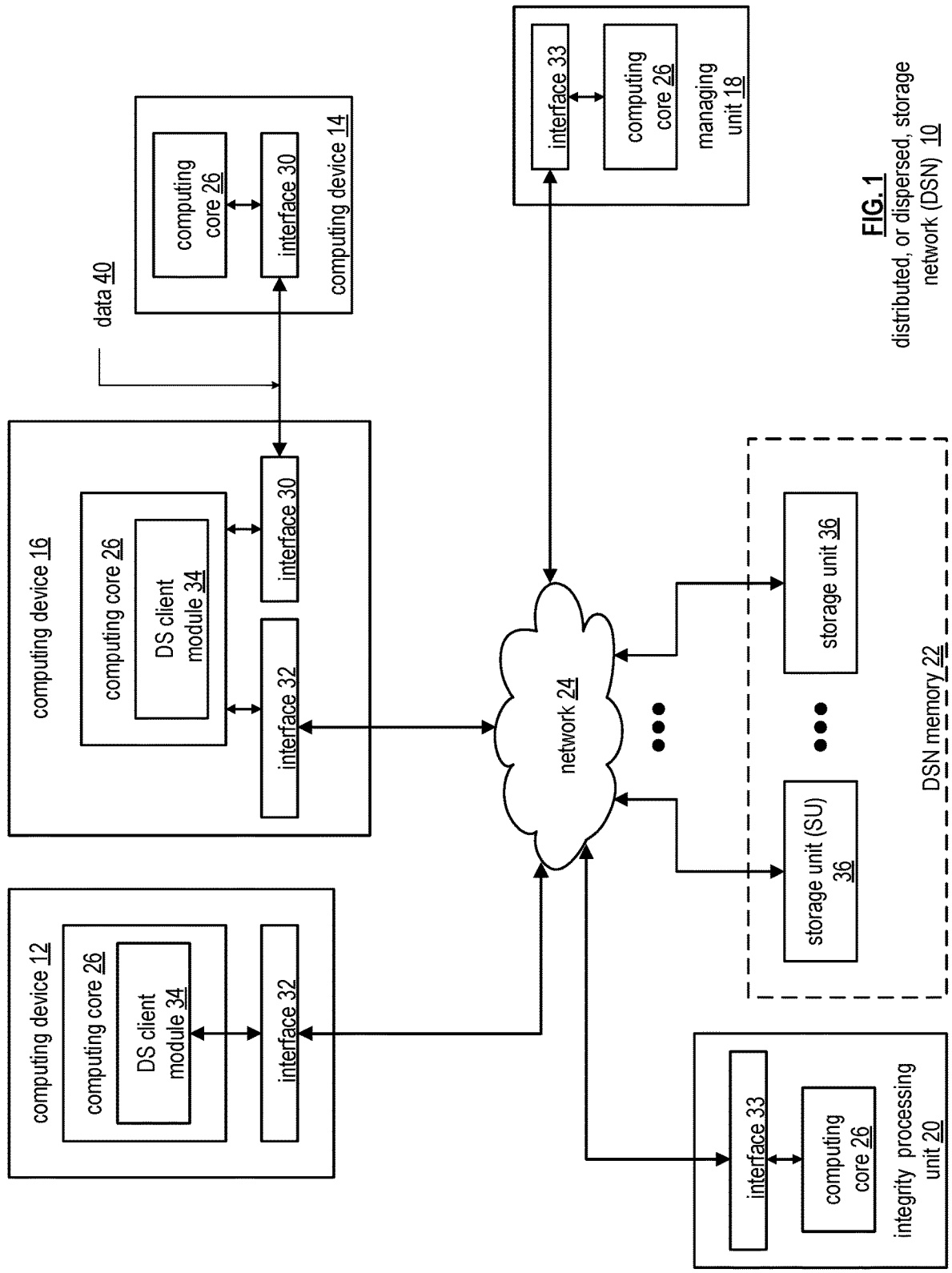
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; one or more satellite communication systems; one or more fiber optic communication systems; and/or one or more local area networks (LAN) and/or wide area networks (WAN).

Figure 2:
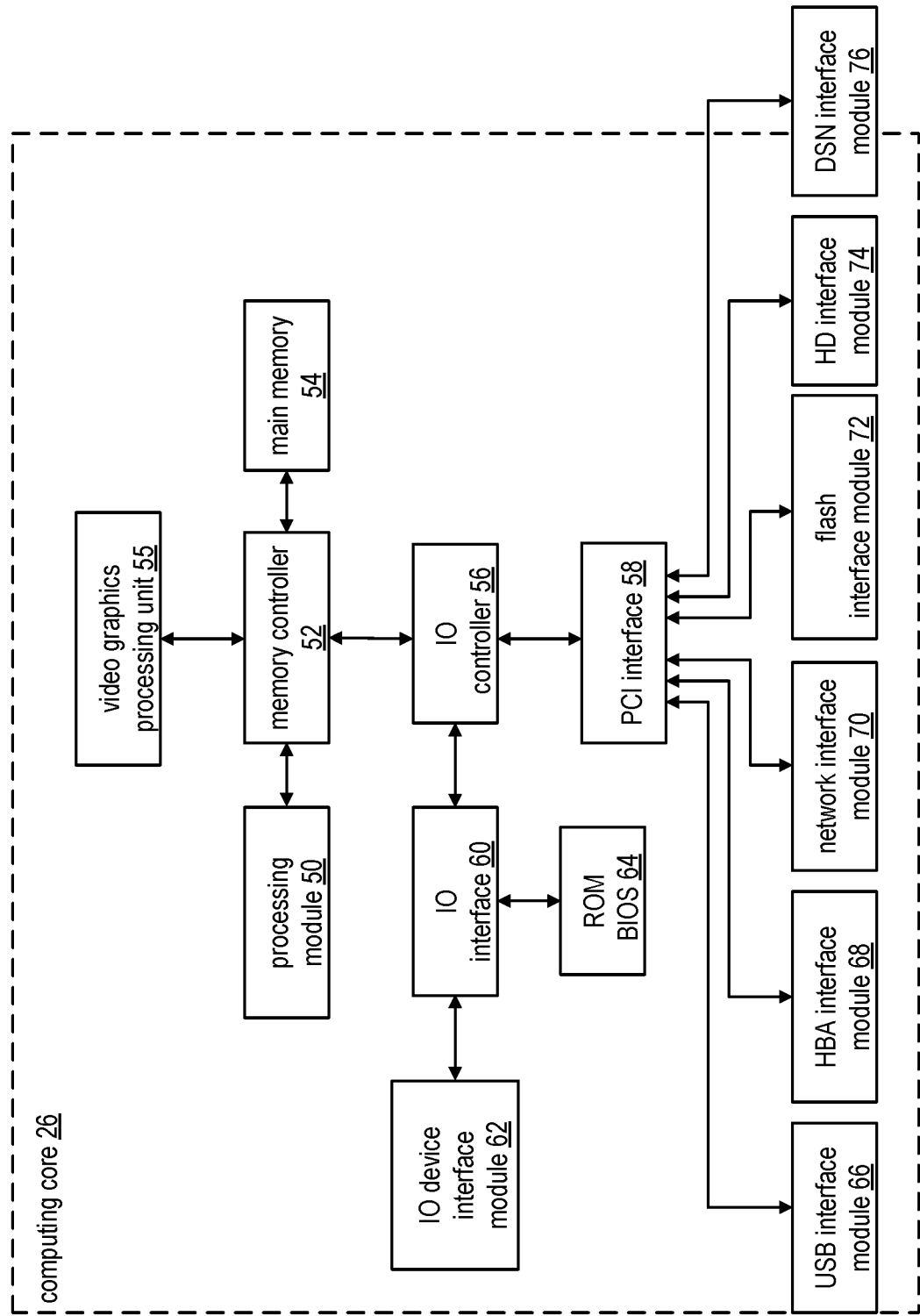
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.). As used herein, the dispersed storage error encoding parameters can be interchangeably referred to as IDA parameters, and T can be interchangeable referred to an IDA width threshold of a dispersed storage error encoding function.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
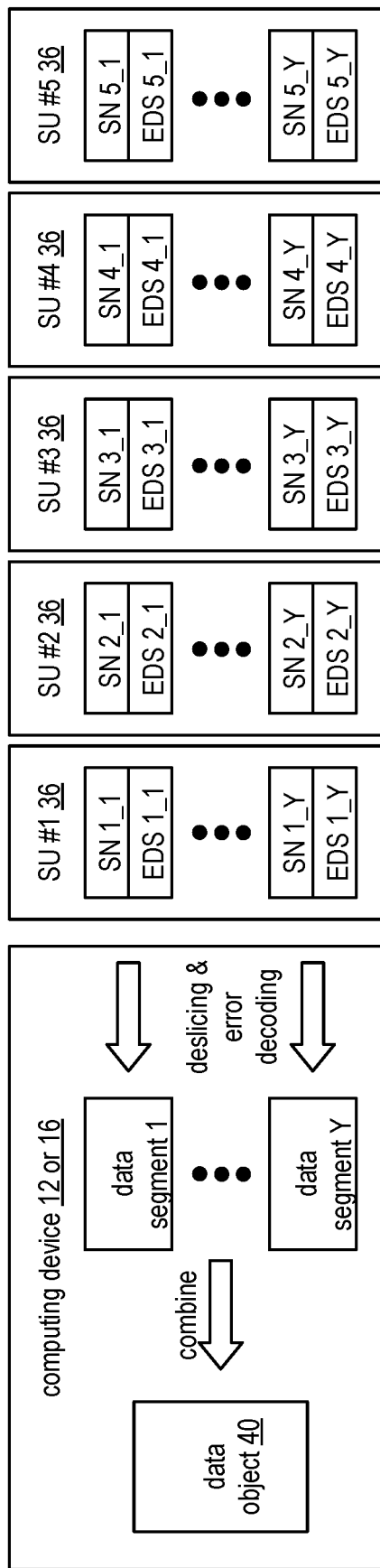
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
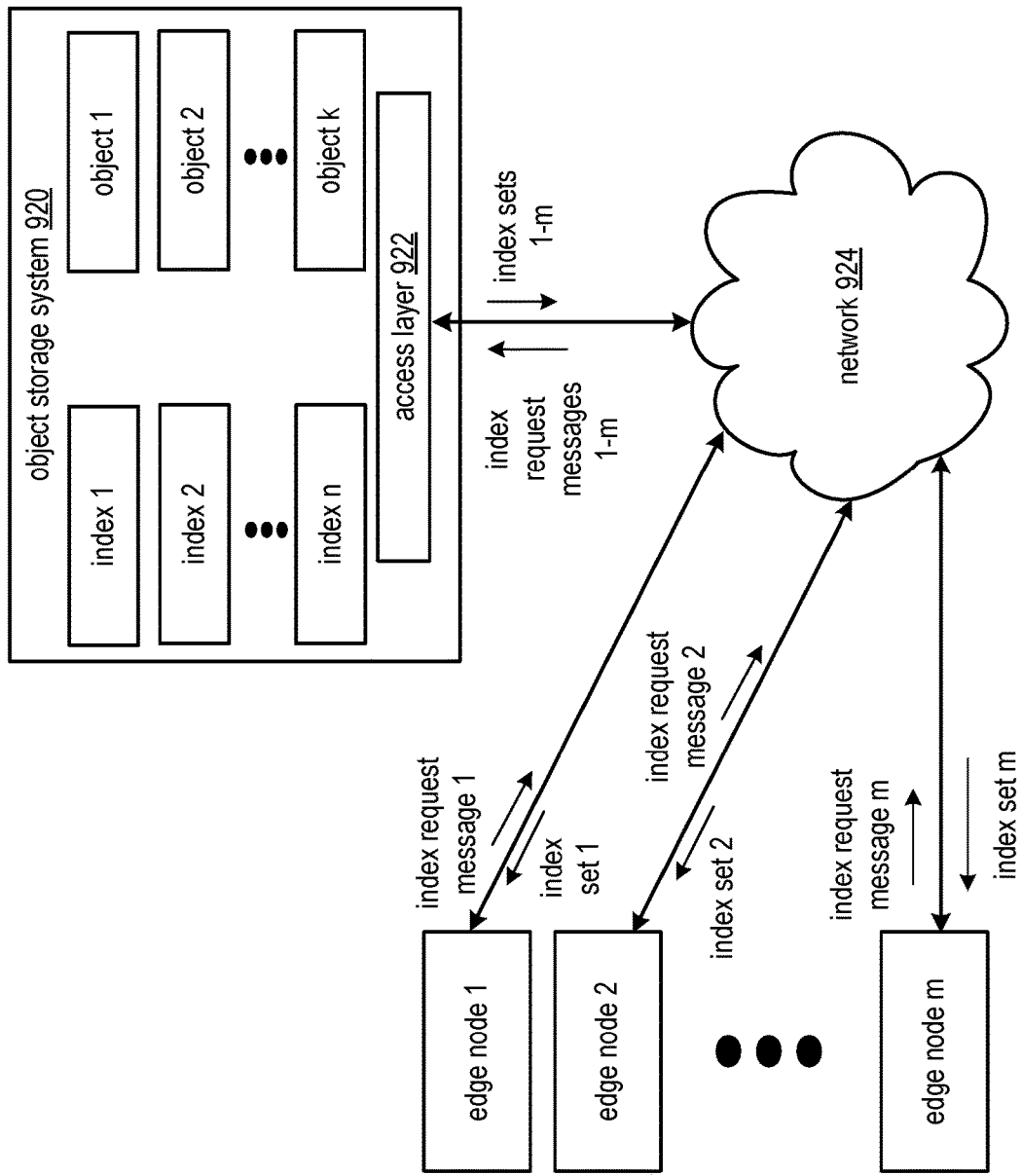
FIG. 9A is a schematic block diagram of an embodiment of an object storage system in accordance with the present invention.

FIG. 9A is a schematic block diagram of an object storage system 920. The object storage system 920 can be operable to store a plurality of data objects 1-$k$. The object storage system 920 can further store and/or otherwise maintain a plurality of indices 1-$n$ that store information such as metadata in reference to some or all of the stored objects 1-$k$, for example, as a plurality of key-value pairs. The object storage system can communicate with a plurality of edge nodes 910 via a network 924. Each edge nodes can be operable to request retrieval of one or more of the indices 1-$n$ from the object storage system 920 for storage locally by the edge node, enabling each edge node to perform edge computing and/or perform analytics on data of the received indices locally.

Each edge node can be implemented by utilizing a computing device 16 and/or a user device 14 of FIG. 1. Alternatively or in addition, the edge nodes can include a computing core 26 and/or can include at least one processor and memory. The network 924 can be implemented by utilizing the network 24 of FIG. 1 and/or can be implemented by utilizing any wired and/or wireless communication between access layer 922 and edge nodes 910. The object storage system 920 can be implemented by utilizing the cloud computing environment of FIG. 11. The edge nodes can be a subset of a plurality of nodes of the cloud computing environment of the object storage system. While the edge nodes are depicted separately from the object storage system in FIGS. 9A and 9B, the edge nodes can be components of the object storage system such as outermost nodes of a plurality of nodes of the object storage system, operable to store and/or retrieve data from storage units and/or deeper nodes of the object storage system via network 924 and/or a network of the object storage system and/or further to communicate with client devices and/or user devices as the outermost nodes of the object storage system.

In some embodiments, the object storage system 920 can include a plurality of storage units 36 of a DSN memory 22 to store the plurality of data objects 1-$k$ and/or the plurality of indices 1-$n$, and/or can otherwise include at least one other memory device operable to store the plurality of data objects 1-$k$ and/or the plurality of indices 1-$n$. The object storage system can include an access layer 922 that is operable to communicate with the plurality of end nodes, for example, by storing data received by the end nodes in deeper elements of the object storage system and/or within the storage units of the object storage system, and by retrieving data objects and/or indices stored in the deeper elements and/or storage units for transmission to one or more end nodes. The access layer 922 can include at least one processor and memory, and can include the computing core 26 of FIG. 2. For example, the access layer 922 can be implemented by utilizing at least one computing device 16 of FIG. 1. In some embodiments, the access layer includes multiple elements such as multiple computing devices 16, and different edge nodes can transmit and receive communications from different elements of the access layer.

The access layer can be operable to communicate with the storage units of the object storage system 920 to store and retrieve data object and/or indices via a network of the object storage system 920. The object storage system can utilize the network 24 of FIG. 1 to enable access layer 922 to store and retrieve data objects and/or indices from the plurality of storage units via the network 24. Alternatively or in addition, network 924 and/or can be integrated within the object storage system 920 to facilitate communication between the access layer and storage of the object storage system. Alternatively or in addition, a different wired and/or wireless network can be utilized within the object storage system 920 to facilitate communication between the access layer and storage of the object storage system.

In some embodiments, some or all data objects and/or some or all indices are dispersed stored by the object storage system 920 in a plurality of storage units as discussed in conjunction with FIGS. 3-8. Alternatively, some or all data object and/or some or all indices are not dispersed stored, and are, for example, stored in each stored in a single location of the object storage system. The access layer 922 can be operable to perform a dispersed storage error encoding function on data segments of a data object received via network 924, for example, from an edge node 910 for storage. Alternatively, the access layer 922 can receive the encoded data slices from an edge node 910 via network 924, where the edge node performed the dispersed storage error encoding function on data segments of the data object to generate the encoded data slices transmitted to the access layer 922. To store the data object, the access layer 922 can transmit the generated and/or received encoded data slices to an information dispersal algorithm (IDA) width threshold number of storage units in the object storage system 920 for storage, for example, via network 24.

The access layer and/or another computing device 16 can generate and/or maintain a plurality of indices for objects stored in memory as a plurality of key-value pairs, and can dispersed store each index by performed the dispersed storage error encoding function on data segments of each index to generate encoded data slices for each index, and can similarly store these encoded data slices for each index to an information dispersal algorithm (IDA) width threshold number of storage units in the object storage system 920.

The access layer 922 can retrieve at least an IDA decode threshold number of encoded data slices of each data segment of a stored data object and/or a stored index from at least a corresponding IDA decode threshold number of storage units of the object storage system 920, for example, in response to a request to retrieve the data object received from an edge node 910 via network 924. The access layer 922 can utilize one or more of these computing devices 16 to perform a dispersed storage error decoding function on the retrieved encoded data slices to regenerate the requested data object and/or requested index, and can transmit the requested data object and/or requested index to the requesting edge node 910. Alternatively, the access layer 922 can transmit the retrieved encoded data slices to the requesting edge node 910, and the edge node can perform the dispersed storage error decoding function on the encoded data slices received from the access layer to regenerate the requested data object and/or requested index itself.

Figure 11:
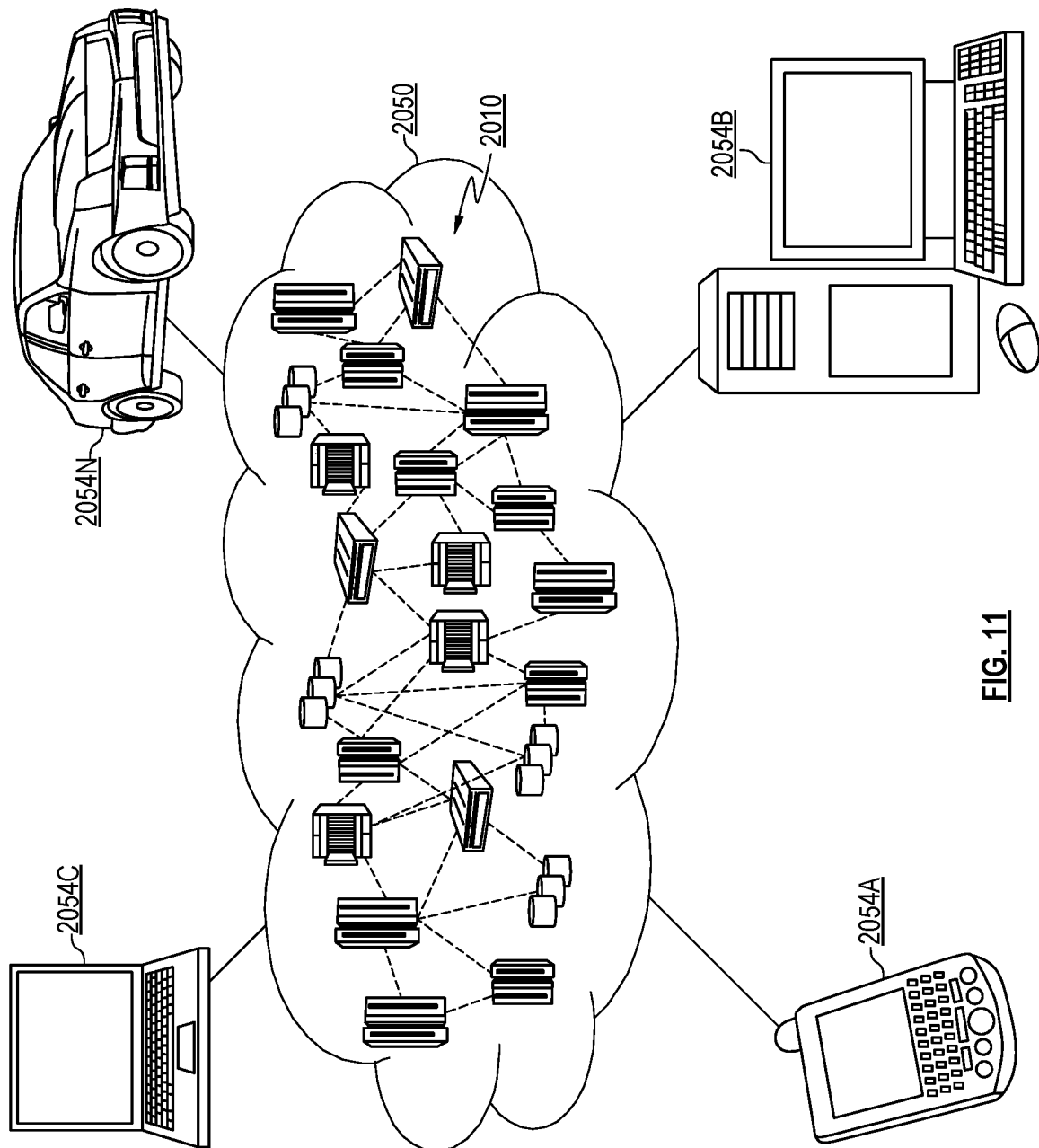
FIG. 11 depicts a cloud computing environment according to an embodiment of the present invention.

Applications, such as Internet of Things (IoT) applications, require aggregated and actionable data at edge nodes, while interacting with object storage systems such the cloud computing environment of FIG. 11 and/or other cloud storage systems. These IoT applications may require data to be available locally to make fast decisions. Interacting with object storage systems such as a cloud storage system based on a DSN memory may not be ideal for real-time applications, for example, requiring low latency due to the time it can take to access the required DSN slice data and build source data. Alternatively or in addition, there may be no way for applications to get system data such as an index or metadata for a group of objects of interest in order to optimize the amount of data to store locally.

The functionality of object storage system 920 and edge nodes 910 present improvements to existing capabilities, for example, by making the index and/or metadata corresponding to data objects stored by the object storage system available for the whole or a subset of the namespace. The data objects can be objects be stored in an index themselves, and/or can be referenced in the index while being stored elsewhere. Edge nodes requiring fast access to aggregated and/or actionable data stored in an index can request for the full index or a subset of the index based on namespace of interest. In addition, there can be multiple indices for which this data could be requested by a client application such as an IoT application, for example, via an Application Program Interface (API) call, such as a Representational State Transfer (REST) API call. The object storage system can return the desired index and metadata data in the response. The index and metadata returned can then be used by an IoT application locally, without having to make requests to the object storage system, thereby speeding up the process.

The index and metadata of interest can be stored in key-value pairs, where the key defines the type of index. For example, a name index can have object names as key. An object type index can have the type of objects, such as an image or audio file or video file, as key. The value can include set of attributes for the object of interest based on the index, and/or can include metadata such as a last modified time, a create time, at least one object owner, an access control list, etc. In addition to system metadata, user specified metadata that provides rich classification of the object can also be indexed and made available at the edge nodes. Indices based on user specified metadata can be used for finding related objects. For example, user specified metadata can indicate an artist of an audio file, and related objects such as all audio files that have a same artist can be queried in the API call. The index received in response can include key-value pairs for only audio files with a particular artist identified in the request as the key, and/or can include key-value pairs for a plurality of audio files that include a same artist as the key.

Figure 9B:
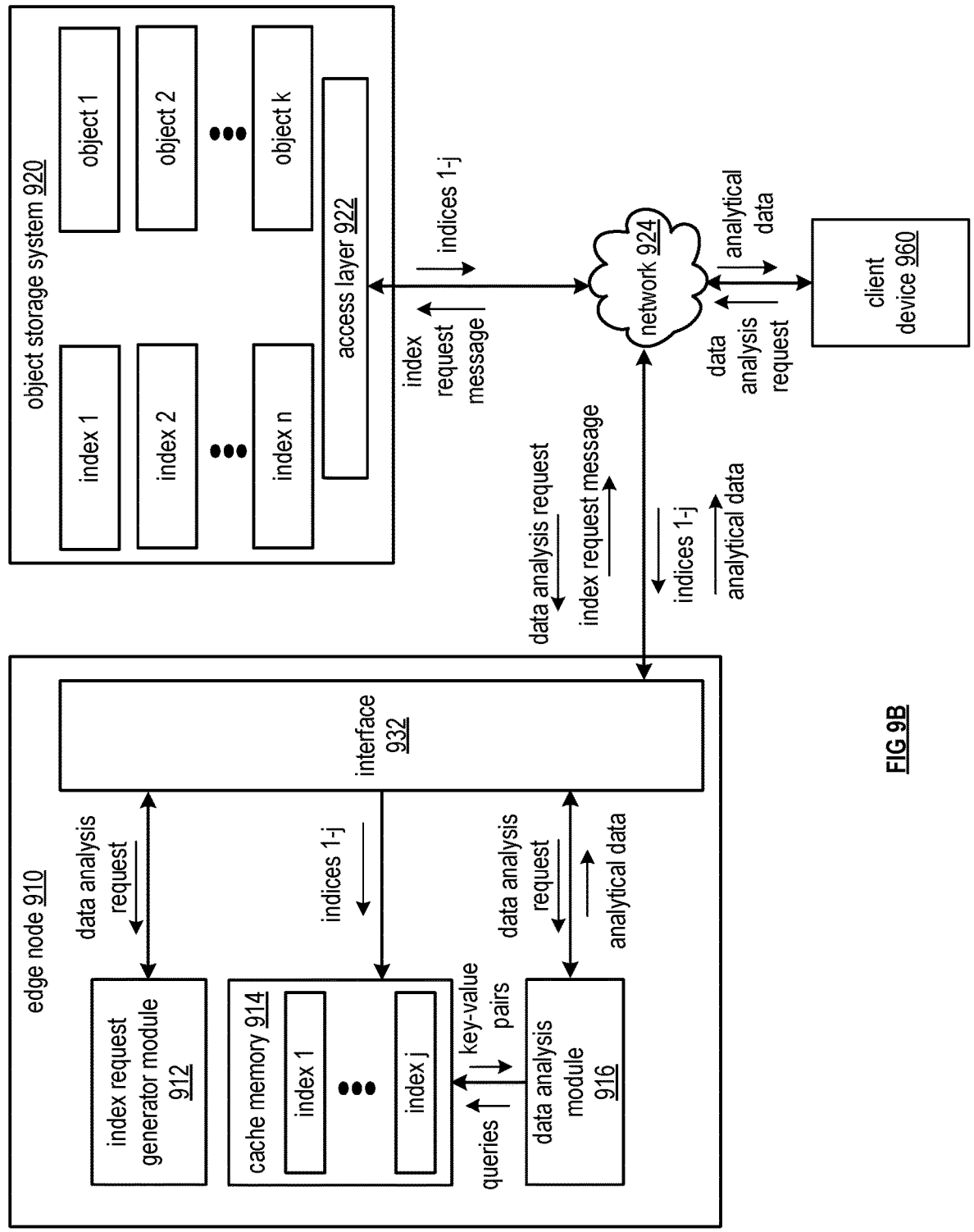
FIG. 9B is a schematic block diagram of an embodiment of an edge node in accordance with the present invention.

FIG. 9B illustrates an embodiment of a particular edge node 910 of FIG. 9A. An edge node can include an interface 932, an index request generator module 912, a cache memory 914, and/or a data analysis module 916. The interface 932 can be implemented by utilizing the interface 32 of FIG. 1. At least one memory of the edge node 910 can be utilized to implement the cache memory 914. At least one memory of the edge node 910 can be further utilized to store operational instructions that, when executed by at least one processor of the edge node 910, cause the edge node to implement index request generator module 912, to implement the data analysis module 916 and/or to implement other functionality of the edge node 910 discussed herein.

A client device 960 can communicate bidirectionally with an edge node 910, for example, via network 924. The client device 960 can be implemented by utilizing user device 14 of FIG. 1, can include computing core 26, and/or can include a processor and/or memory. The client device 960 can be implemented by utilizing an IoT device. The client device 960 can include a display device operable to display a graphical user interface to a user and/or can enable a user to enter user input in response to prompts displayed by the graphical user interface. In some embodiments, the client device 960 can be integrated within edge node 910, can be operably coupled to edge node 910, and/or can communicate with edge node 910 via a communication link that is separate from network 924, such as a direct communication link between edge node 910 and client device 960. For example, all of the functionality of the edge node can be performed by a client device 960 and/or an end user device operable to communicate directly with object storage system 920.

The edge node 910 can determine to request at least one index from the object storage system 920 for local storage and/or local analysis, for example, by utilizing the index request generator module 912. In some embodiments, the edge node can determine to generate the request based on receiving a data analysis request from a client device 960 via a network, for example, based on user input to a graphical user interface displayed on a display device of the client device 960. The data analysis request can include a request for a particular analysis, can include a request for one or more particular full and/or partial indices, and/or can otherwise indicate a need to retrieve one or more particular full and/or partial indices from the object storage system for storage by the edge node, for analysis by the edge node, and/or for transmission to the client device. Alternatively or in addition, the edge node can determine to generate the request for an index in response to determining that a time to live (TTL) of a corresponding, currently stored index has elapsed and needs to be updated, and/or otherwise in response to determining that a corresponding, currently stored index otherwise includes inaccurate and/or out-of-date information.

Once the edge node 910 has determined to request the at least one index, the edge node 910 can utilize the index request generator module 912 to generate an index request message for transmission to the object storage system 920. The index request message can indicate one or more particular indices stored by the object storage system 920 to be retrieved by the edge node 910. The object storage system 920 can evaluate the index request message, and can generate an index indicated in the index request message and/or can retrieve some or all of an already stored index from memory. The object storage system 920 can then generate a response message to the edge node 910 that includes the some or all of each requested index in the index request message.

The index request message can further indicate filtering parameters for each requested index, and the object storage system can select a proper subset of pairs in each requested index that compare favorably to the filtering parameters. This can include comparing the key of each pair, value of each pair, and/or other metadata corresponding to the object of each pair, to the filtering parameters to determine whether the pair corresponds favorably to the filtering parameters. The filtering parameters can be determined by the edge node 910 based on the data analysis request and/or other instructions received from the client device 960, based which pairs are needed to perform a particular analysis indicated in the data analysis request, and/or based on other information. The filtering parameters can include a modified since threshold time, where only pairs with values and/or other metadata indicating the corresponding object has been modified at a time equal to or more recently than the modified since threshold time are included in the index returned by the object storage system 920. The filtering parameters can include an unmodified since threshold time, where only pairs with values and/or other metadata indicating the corresponding object has been modified at a time equal to or less recently than the unmodified since threshold time are included in the index returned by the object storage system 920. The filtering parameters can indicate a namespace range of interest, where only pairs corresponding to objects with names that are within and/or otherwise compare favorably to the namespace range of interest are included in the index returned by the object storage system 920. The filtering parameters can indicate a key range of interest for a requested index and/or can indicate a subset of possible keys of the index, where only pairs with keys that compare favorably to the key range of interest and/or that are included in subset of possible keys of the index are included in the index returned by object storage system 920. The filtering parameters can indicate a value range of interest for a requested index and/or can indicate a subset of possible values of the index, where only pairs with values that compare favorably to the value range of interest and/or that are included in subset of possible values of the index are included in the index returned by object storage system 920. In some embodiments where the value includes a plurality of fields, as discussed in further detail in conjunction with FIG. 9C, the filtering parameters a value range of interest for one or more value fields of a requested index and/or can indicate a subset of possible values of one or more value fields of the index, where only pairs with value fields populated by values that compare favorably to the value range of interest for the corresponding value field and/or that are included in subset of possible values for the value field of the index are included in the index returned by object storage system 920.

The edge node 910 can receive the requested full and/or partial one or more indices 1-*j* in a response message generated by the object storage system 920. The edge node 910 can store each received index in the cache memory 914 in response to receiving the indices in the response message, and/or can transmit some or all pairs of some or all indices 1-*j* directly to the client device 960 in response to response to receiving the indices in the response message. The response message can further include TTL information generated by the object storage system 920 for each index 1-*j* and/or other data utilized by the edge node 910 to determine a time period that the index should be stored in the cache and/or indicating a time that the index expires and should be deleted from the cache. Each index can have the same and/or different TTL information, where different indexes are stored in the cache memory 914 for longer time periods than others based on the TTL information received from the object storage system. The edge node 910 can delete an index from the cache memory in response to determining its corresponding time period for storage has elapsed. The edge node 910 can regenerate an index request message for a currently stored index to the object storage system automatically in response to determining the time period for storage of the index in cache has elapsed and/or is going to elapse soon. This can include regenerating the same index request message for the same index with the same filtering parameters. Alternatively, if data analysis needs are determined to have changed over time and/or if the client device requests different types of data and/or different types of analysis, the next index request message for subsequent retrieval of the index in response to the current index expiring can be updated with new filtering parameters based on these new needs.

The edge node 910 can utilize data analysis module 916 to perform analytical functions on the pairs stored in one or more indices in cache memory. This can include performing functions indicated in one or more data analysis requests received from one or more client devices 960 and/or otherwise determined to be performed on one or more indices. The analysis functions can include further querying, filtering, aggregating, and/or statistical processing of pairs stored in a single index and/or stored across multiple indices. Output and/or other results of the analysis functions, such as statistical analysis data for the objects resulting from analytical functions corresponding to statistical analysis of metadata of the objects indicated in the plurality of pairs included in one or more indices, can be transmitted to the client device 960, for example, for display to a user via a GUI presented on a display device. In some embodiments, output and/or other results of an analytical function can be transmitted to the object storage system 920, for example, to update a currently stored object based on the output of an analytical function, to write a new object to the object storage system 920 reflecting the output of an analytical function, to update a currently stored index based on the output of an analytical function, and/or to add a new index for currently stored objects indicated in the indices utilized to perform the analytical function for storage by the object storage system 920 based on the output of an analytical function. Alternatively or in addition, some or all of the indices 1-*j* can be transmitted directly to the client device 960 in response to being received from the object storage system and/or in response to being requested in the data analysis request, and the client device can perform its own analytical function on the indices 1-*j* directly.

In some embodiments, the analytical functions are indicated in an original data analysis request received from the client device 960 that prompted the edge node to request one or more corresponding indices from memory, where instructions to perform these functions are cached by the edge node 910 until the corresponding indices are received in response messages from the object storage system. For example, the edge node 910 can determine that the indices required to perform the requested analytical function are not stored, and can generate the index request message in response. Once the indices are retrieved, the originally requested analysis functions can be performed on the indices accordingly. Alternatively or in addition, one or more data analysis requests can be received from the client device 960 subsequently to storing the index in cache memory 914, and corresponding analytical functions can be performed on the stored indices once these data analysis requests are received.

In some embodiments, the time period for storage of an index is determined by the edge node 910 and/or is altered by the edge node based on analytical functions performed on the index. For example, once a requested analytical function is performed on one or more corresponding indices, these indices can be deleted by edge node 910 in response to completion of performing the requested analytical function. In particular, this deletion can be facilitated before the corresponding time period has elapsed if analysis is determined to be complete and/or an updated index can be requested early if there is a lapse in requests for analysis on the corresponding index.

Alternatively or in addition, the edge node 910 can automatically extend a time period for an index, for example, in response to currently performing analytics on the index and/or in response to receiving at least a threshold number of requests for analysis on the index within a threshold amount of time before the index is scheduled to be deleted from cache. In particular, the edge node 910 can briefly extend the time period to wrap up performance of analytical functions, even if this information may be slightly outdated. In such embodiments, the edge node can transmit the results to a requesting client device 960 and can indicate that these results may include outdated information. The edge node can transmit the request for an updated index in response to determining completion of the analysis on the currently stored index will result in outdated output, for example, before analysis on the currently stored index is complete. Once the updated index is received and/or once analysis on the currently stored index is complete and/or transmitted to the requesting client device 960, the same analysis can be immediately performed on the updated index automatically for transmission to the requesting client device 960. This can aid in ensuring the client device 960 only has to rely on these outdated results for a brief amount of time. For example, the edge node can indicate in the transmission of outdated results to the client device that updated results will be generated for an updated index for transmission to the client device once they are available.

The client device 960 and edge node 910 can operate as separate nodes, as illustrated in FIG. 9B. For example, client devices 960 corresponding to IoT devices with lower power, storage, memory, and/or processing capabilities may not be capable of storing the indices and/or may not be capable of performing analytical functions on the indices. The client device 960 can rely on edge node 910 in this regard to retrieve and store the indices, and/or to perform the analytical functions, as illustrated in FIG. 9B. The client device can send instructions and/or receive results from the client device 960 as discussed. Some or all of the edge nodes 1-*m* of FIG. 9A can communicate with separate client devices 960 in this manner. For example, client devices that are not capable of performing the functionality of an edge node 910 themselves can each rely on one of the set of edge nodes 1-*m* as illustrated in FIG. 9B.

Alternatively, the client device 960 and edge node 910 of FIG. 9B can be incorporated within a single device and/or can otherwise be integrated within a same node. For example, client devices 960 corresponding to IoT devices with higher power, storage, memory, and/or processing capabilities may be capable of retrieving and storing the indices, performing analytical functions on the indices, and/or performing other functionality of the edge node 910 themselves. Thus, such client devices 960 can be utilized to implement the edge nodes 910. In such embodiments, the communication between edge node 910 and client device 960 illustrated in FIG. 9B is not necessary, as the client device 960 implements and/or is otherwise incorporated within the edge node 910. Some or all of the edge nodes 1-*m* of FIG. 9A can be implemented by utilizing client device 960 in this manner. For example, at least one of the edge nodes 1-*m* is implemented by a client device 960 that is operable to perform the functionality of an edge node 910.

FIG. 9C illustrates an example embodiment of a plurality of indices 1-*j* stored in cache memory 914. Each index can include a plurality of key-value pairs for a plurality of corresponding objects as discussed previously. For example, index 1 corresponds to a name index, and stores object names for a plurality of objects 1-*p* as the key. The value for each pair in index 1 includes a set of metadata for the object 1_1-1_*x*. For example, x different metadata fields can store different types of information indicating the metadata of the corresponding metadata field. The corresponding name index stored by the object storage system 920 may include pairs for more than p objects, for example, where the p pairs included in index 1 sent to the edge node 910 for storage in cache 914 were filtered from the entirety of pairs of the corresponding name index of the object storage system 920 based on the filtering parameters included in the index request message. Alternatively or in addition, the corresponding name index stored by the object storage system 920 may include more than x metadata fields in its values, for example, where the x metadata fields included in index 1 sent to the edge node 910 for storage in cache 914 were filtered from the entirety of metadata fields of values in pairs of the corresponding name index of the object storage system 920 based on the filtering parameters included in the index request message.

In the example illustrated in FIG. 9C, index 2 corresponds to an object type index, where the key of each pair indicates the type of the corresponding object. This can include indicating that the object corresponds to an image file, a video file, an audio file, and/or another type of object, where all of the keys corresponds to one of a set of types of the objects stored in the object storage system. In some embodiments, the name of the object is further indicated in the key and/or the value of the pair and/or is otherwise mapped to the pair, for example, to enable the identity of the corresponding object to be determined given the key-value pair. The values of the pairs in index 2 can a set of metadata for the object 2_1-2_*y*, corresponding to y different metadata fields. The metadata fields 2_1-2_*y* can all be the same metadata fields as metadata fields 1_1-1_*x*, can all be different metadata fields as metadata fields 1_1-1_*x*, and/or can include a proper subset of metadata fields that are also included in metadata fields 1_1-1_*x*. In some embodiments, a key of one index can be a metadata field of another index. For example, one of the metadata fields 1_1-1_*x* can include an object type field for the corresponding object, and the keys of index 2 can indicate this object type field for some or all of the object of index 1. The p objects in index 2 can be the same p objects indicated in index 1, for example, where some indices store pairs for identical sets of objects in the object storage system. Index 2 may have been similarly filtered from its corresponding index in the object storage system, where the corresponding index includes more than p pairs and/or has values with more than y metadata fields.

The other indices 3-*j* can have different keys and can each store pairs for some or all of the same objects 1-*p*, and/or can store pairs for a set of objects that is entirely distinct from objects 1-*p*. For example, objects 1-*q* represented in index j can be exactly the same as objects 1-*p*, can have a non-null difference and also have a non-null intersection with objects 1-*p*, or can have a null intersection with objects 1-*p*. Each index can similarly a subset of the pairs of the corresponding index in the object storage system 920 and/or can include all of the pairs of the corresponding index. Each index can similarly a subset of the metadata fields of values in pairs of the corresponding index in the object storage system 920 and/or can include all of the metadata fields of the corresponding index in the object storage system.

In some embodiments, the particular metadata fields included in values of a particular index are based on the type of index, for example, as denoted by the key. For example, if index j stores pairs for audio files corresponding to song files, the key can corresponds to an artist that wrote the song in the corresponding audio file. As this index is specific to songs, the other metadata fields can be specific to the artist and/or the song, such as a recording studio where the corresponding song was recorded, an album the corresponding song belongs to, demographic information for the artist that wrote the song, etc. Other information about the object, may not be pertinent for the use of this index in analysis by the edge node 910, and thus other metadata for the object that is not related to such musical features may be omitted from the set of metadata included as values of this particular index. Some or all of this other, omitted metadata for the same objects may be included in other indices that store values for these objects. In such embodiments, a corresponding index for index j stored by the object storage system may include pairs with keys spanning all artists for audio files stored by the object storage system, and the index j may have been filtered to only include pairs for one or more particular artists indicated in the filtering data and/or to only include pairs for artists that compare favorably to the filtering criteria, such as artists over a particular age or artists with over a threshold number of songs stored in the object storage system. For example, this related information may be stored as a metadata field in values of each pair for use by the object storage system to filter the index to generate index j accordingly.

In other embodiments, keys of each index are unique. Values can include attribute describing characteristics of objects that that have metadata or other attributes that compare favorably to the key and/or can indicate aggregated data and/or enumerated data for a plurality of objects that have metadata or other attributes that compare favorably to the key. For example, an index keyed by song artist can have values indicating a number of songs written by the artist, a range of years the corresponding songs were written, and/or other aggregated data. Alternatively or in addition, the value of a pair can include identifiers and/or can otherwise be mapped to every object corresponding to the key. For example, a pair corresponding to a particular artist can indicate identifiers of data objects corresponding to all songs written by the artist.

Figure 9D:
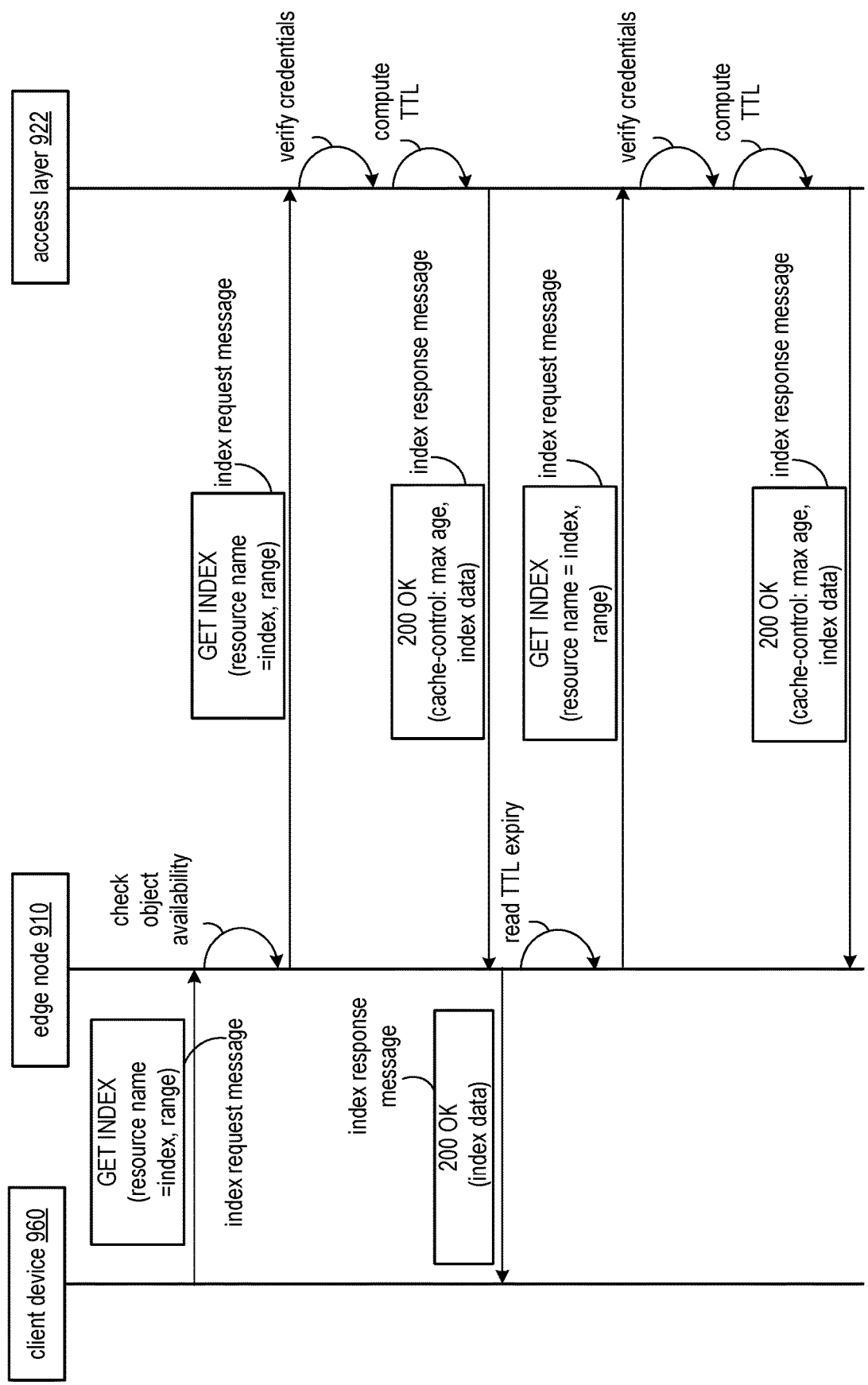
FIG. 9D is flow diagram of an example flow of retrieval of index data in accordance with the present invention.

FIG. 9D illustrates an example of the process of retrieving an index from the object storage system. The edge node 910 can receive an index request message from a client device 960 indicating an index to be retrieved by edge node 910. For example, this can be included in the data analysis request received from the client device 960. The edge node 910 can generate an index request message based on the request from the client device for transmission to access layer 922 and/or can relay the index request message received from the client device to access layer 922. This can include identifying the index being requested by its name or other identifier, and can include specifying the filtering parameters as a continuous or non-continuous range of the index, for example, with respect to the keys of the index. The edge node 910 can first perform a check for object availability, for example, by determining whether or not the index and corresponding range is already stored in cache 914, and can issue the request to the access layer only when the corresponding range of the corresponding index is not already stored.

The access layer 922 can verify credentials of the edge node, and if the credentials of the edge node are determined to be verified, can transmit an index response message in response. The index response message can include the full and/or filtered index that was requested as index data. The access layer 922 can further compute and/or otherwise TTL for each index being transmitted in the index response message, for example, where the TTL is included in cache-control data of the index response message, indicating the maximum age for the index to be stored in the cache of the edge node 910. The edge node can store the index data in cache, can transmit the index data to the client device, and/or can perform analytical functions of the index data to generate analytical output for transmission to the client device.

In some embodiments, the index request message request from an edge node 910 to the object storage system 920 could use a request format, for example, utilizing a REST API protocol. For example, a request can include the following:

```
GET/systemData/Index/<Type of Index>HTTP/1.1
HOST: <Cloud Storage EndPoint>
DATE: <Date>
```

The type of index can include one of the plurality of selected index types. For example, a name index can be indicated as the or a particular object type index can be indicated as the type of index. The cloud storage endpoint can indicate a location of the index in the object storage system and/or a location of a processing system operable to generate and or retrieve the index from the object storage system for transmission back to the edge node, such as an identifier of one or more computing devices of access layer 922.

The response to the request from the edge node that is sent by cloud object storage could use a response format such as:

```
HTTP/1.1 200 OK
Last-Modified: <date>
cache-control: <time>
{
"Rows":
  [
  "<Key Name>":"<Key>",
  "Values": ["<Value>", "<Metadata #1>", "<Metadata #2>", "<Metadata #N>"]
  ]
```

Each row can denote one of the plurality of pairs, where each pair includes one key corresponding to the type of index, and where each pair includes a plurality of metadata 1-N.

The edge node can determine when an index has expired or is about to expire by reading the TTL of the cache-control information, and can generate a new index request message in response for transmission to the access layer. The access layer can similarly verify credentials and/or compute a TTL for the requested index, and can transmit the requested index in response. The edge node 910 can replace the index data outdated index in cache with the newly received index data.

Each index request message transmitted by the edge node 910 can indicate a single index for retrieval, where multiple index request messages are transmitted to request retrieval of multiple indices, and/or where multiple index response messages are transmitted by the access layer 922 in response, each indicating a corresponding one of the multiple requested indices. Alternatively, a single index request message can indicate multiple indices being requested and/or a single index response message can indicate index data for multiple indices.

In various embodiments, an edge node is included within an object storage system and/or communicating with an object storage system that stores a plurality of objects and that further stores a plurality of indices for the plurality of objects, for example, in a plurality of storage units of the object storage system. The edge node includes a processing system that includes at least one processor and a memory that stores operational instructions. The operational instructions, when executed by the at least one processor cause the processing system to determining to retrieve index data for a set of objects of the plurality of objects stored by the object storage system. An index type is selected from a plurality of index types in response to determining to retrieve the index data, where one of the plurality of indices stored by the object storage system corresponds to the index type. A request message indicating a request for the index data of the one of the plurality of indices stored by the object storage system is generated, and the request message is transmitted to the object storage system, for example, via a network such as a network of the object storage system. The index data for the set of objects is received in a response message from the object storage system, where the response message is transmitted to the edge node by the object storage system in response to receiving the request message, for example, via the network. The index data is stored in local memory in response to being received in the response message. The index data can include a plurality of pairs that each include a key and a value. All of the keys of each pair in the index data can correspond to the index type, and each of the plurality of pairs can correspond to one of the set of objects. The value of each pair can include metadata of the one of the set of objects and/or can include some or all of the content of the one of the set of objects, such as the entirety of the one of the set of objects itself.

Figure 10:
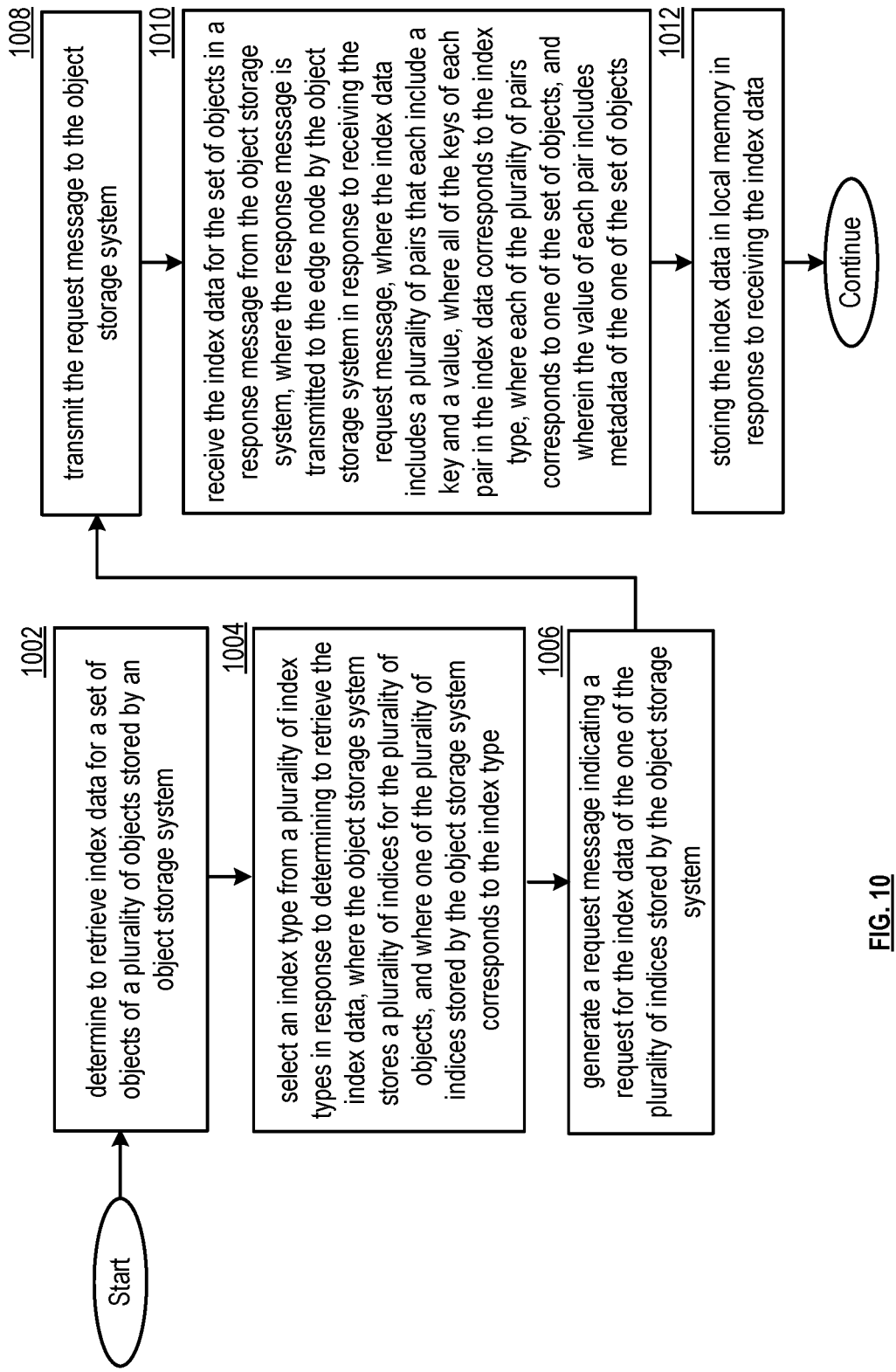
FIG. 10 is a logic diagram of an example of a method of retrieving index data in accordance with the present invention.

FIG. 10 is a flowchart illustrating an example of retrieving index data for data objects stored in an object storage system. In particular, a method is presented for use in association with one or more functions and features described in conjunction with FIGS. 1-9D, for execution by a processing system, for example, of an edge node, a computing device, and/or client device, that includes a processor or via another processing system of a dispersed storage network that includes at least one processor and memory that stores instruction that configure the processor or processors to perform the steps described below.

Step 1002 includes determining to retrieve index data for a set of objects of a plurality of objects stored by an object storage system. Step 1004 includes selecting an index type from a plurality of index types in response to determining to retrieve the index data. The object storage system can store a plurality of indices for the plurality of objects, and one of the plurality of indices stored by the object storage system corresponds to the index type. Step 1006 includes generating a request message indicating a request for the index data of the one of the plurality of indices stored by the object storage system. Step 1008 includes transmitting the request message to the object storage system. Step 1010 includes receiving the index data for the set of objects in a response message from the object storage system, where the response message is transmitted to the edge node by the object storage system in response to receiving the request message. The index data can include a plurality of pairs that each include a key and a value. All of the keys of each pair in the index data can corresponds to the index type, each of the plurality of pairs can correspond to one of the set of objects, and/or the value of each pair can include metadata of the one of the set of objects. Step 1012 includes storing the index data in local memory in response to receiving the index data.

In various embodiments, the request message includes a response cache control parameter. For example, the cache control parameter can indicate a request for the object storage system to include cache control data in the response. A cache control header can be included in the response message by the object storage system. The cache control header can be set to include cache control data indicating a time period the edge node is to store the index data based on the cache control parameter. For example, the object storage system can calculate and/or otherwise determine a TTL of the index data, where the time period corresponds to the TTL. The method can further include deleting the index data from the local memory in response to determining the time period has elapsed.

In various embodiments, the method includes generating a second request message indicating a request for updated index data of the one of the plurality of indices stored by the object storage system in response to determining the time period has elapsed. The same or different parameters indicating a full index or a particular subset of a particular index indicate in the previous request message generated in step 1006 can be included in the second request message. The second request message can be transmitted to the object storage system. The updated index data for the set of objects can be received in a second response message from the object storage systems, for example, where the object storage system generates the second response message in the same fashion as generating the response message that includes the original index data. The updated index data in the local memory in response to receiving the updated index data, for example, to replace the previous index data. The second response message can similarly include a new time period for the updated index data, for example, determined by the object storage system. This process of determining an index has expired or is about to expire, and requesting an updated index in response to replace the previous index until it is determined to expire itself, can be repeated by the processing system.

In various embodiments, the method includes determining filtering criteria for retrieval of the index data. The request message is generated to include the filtering criteria. The index data received in the response message corresponds to a proper subset of pairs of the one of the plurality of indices stored by the object storage system, and the proper subset is selected from the one of the plurality of indices by the object storage system based on the filtering criteria. In various embodiments, the filtering criteria includes a namespace range, and the proper subset of pairs of the one of the plurality of indices is selected by the object storage system to include only pairs of the one of the plurality of indices with keys that compare favorably to the namespace range and/or that correspond to objects with names that compare favorably to the namespace range. In some embodiments, this namespace range can correspond to object names and/or to a range of possible keys and/or values for the particular index that is requested, such as a subset of possible object types for keys in the index, and/or a subset of possible metadata values for values in the index. The object storage system can similarly include only pairs of the requested index that meet this filtering criteria, for example, by comparing the keys of each pair to the filtering criteria and selecting only pairs with keys that compare favorably to the filtering criteria, and/or by comparing the values of each pair to the filtering criteria and selecting only pairs with keys that compare favorably to the filtering criteria. In some embodiments, the object storage system can filter some or all of the set of metadata from the values of some or all pairs, for example, in response to the request indicating that only a proper subset of the set of metadata included in each pair be included in the index transmitted by the object storage system.

In various embodiments, the filtering criteria indicates a time corresponding to a last modified since threshold. The proper subset of pairs of the one of the plurality of indices is selected by the object storage system to include only pairs of the one of the plurality of indices with values indicating a last modified time that is more recent than the time. In various embodiments, the filtering criteria includes a last unmodified since threshold, and the proper subset of pairs of the one of the plurality of indices is selected by the object storage system to include only pairs of the one of the plurality of indices with values indicating a last modified time that is less recent than the time.

In various embodiments, the one of the plurality of indices is one of: a first one of the plurality of indices or a second one of the plurality of indices. A first pair for one of the plurality of objects is included in the first one of the plurality of indices, and a second pair for the one of the plurality of objects is included in the second one of the plurality of indices. The value of the first pair includes a first subset of a plurality of metadata for the one of the plurality of objects, and the value of the second pair includes a second subset of the plurality of metadata for the one of the plurality of objects. A set difference between the first subset and the second subset is non-null. For example, the first subset can be metadata related to the index type of the first one of the plurality of indices, and the second subset can be metadata related to the index type of the second one of the plurality of indices.

In various embodiments, the one of the plurality of indices is the first one of the plurality of indices. The method includes determining to retrieve second index data for a second set of objects of the plurality of objects stored by the object storage system, where an intersection between the second set of objects and the first set of objects includes the one of the plurality of objects. A second index type from the plurality of index types in response to determining to retrieve the second index data for the second set of objects, where the second one of the plurality of indices stored by the object storage system corresponds to the second index type. The request message further indicates a request for the second index data of the second one of the plurality of indices stored by the object storage system, and the second index data is received for the set of objects in the response message from the object storage system includes index data of the first one of the plurality of indices. Alternatively, a separate request message can be transmitted to request the second one of the plurality of indices, and/or the second one of the plurality of indices can be received in a separate response message. The second index data in the local memory in response to receiving the second index data.

In various embodiments, the first index type of the first one of the plurality of indices corresponds to a name index. The second index type of the second one of the plurality of indices corresponds to an object type index. The key of the first pair corresponds to a name of the one of the plurality of objects, and the key of the second pair corresponds to an object type of the one of the plurality of objects.

In some embodiments, the second one of the plurality of indices stores pairs for objects corresponding to a plurality of different object types, where the key denotes the one of the plurality of object types of the corresponding object, and where each of the plurality of different object types are indicated in the key for at least one of the plurality of pairs for the second one of the plurality of indices. For example, the plurality of object types of objects stored in the object storage system can include an audio file type, a video file type, and an image file type. The key of each pair in the second one of the plurality of indices can indicate one of the plurality of object types, indicating whether the corresponding object is, for example, an audio file, a video file, or an image file.

Alternatively, the second of the plurality of indices can store pairs for objects corresponding to a same one of the plurality of different object types. In such embodiments, additional indices can store pairs for objects, where each additional index similarly stores pairs for objects corresponding to a same one of the plurality of different object types. In these embodiments, the object storage system can store a different index for each of the plurality of object types, where each different index stores pairs corresponding to exactly one of the plurality of object types. In some embodiments, these different, object specific indices can be stored in addition to an object type index that stores pairs for different types of object, each with a key denoting the particular type of object.

In various embodiments, a third index type of a third one of the plurality of indices corresponds to an artist name type. Each pair in the third one of the plurality of indices corresponds to an audio file, and the key of each pair in the third one of the plurality of indices indicates one of a plurality of artists of the audio file.

Alternatively or in addition, some or all indices can include keys that correspond to user-defined metadata and/or particular characteristics and/or metadata of the data object. For example, in various embodiments, an index type of the second one of the plurality of indices corresponds to one metadata field of the first subset of the plurality of metadata, where the plurality of metadata corresponds to a plurality of metadata fields. The one metadata field of the first subset of the plurality of metadata is included in the set difference. A metadata value of the one metadata field in the first subset of the plurality of metadata is a first one of a plurality of possible metadata values for the one metadata field. All of the keys of each pair in the second one of the plurality of indices indicates a corresponding one of the plurality of possible metadata values for the one metadata field, and the key of the second pair indicates the first one of a plurality of possible metadata values for the one metadata field.

In various embodiments, the method includes generating statistical analysis data by performing at least one analysis algorithm on the index data. The method can further include facilitating display of the statistical analysis data via a graphical user interface on a display device of a client device associated with the edge node. For example, the statistical analysis data can be transmitted to the client device for display. In some embodiments, the at least one analysis algorithm is determined based on a request received from the client device, for example, indicating a type of analysis to be performed and/or including instructions corresponding the at least one analysis algorithm. In some embodiments, determining to retrieve the index is in response to the same or different request from the client device. For example, in response to receiving a request to perform analysis on a particular index from the client device, the particular index can be retrieved by the processing system in response to receiving the request and/or in response to determining the particular index is not already stored in cache memory from a prior retrieval. If the particular index is already stored and/or once the particular index is retrieved, the analysis can be performed by utilizing the particular index stored in cache memory. The analysis can be performed on some or all of set of metadata or other information included in the key and/or value of some or all pairs of one or more indices stored in cache memory.

In various embodiments, a non-transitory computer readable storage medium includes at least one memory section that stores operational instructions that, when executed by a processing system, for example, of a dispersed storage network (DSN), that includes a processor and a memory, causes the processing system to determine to retrieve index data for a set of objects of a plurality of objects stored by an object storage system. An index type is selected from a plurality of index types in response to determining to retrieve the index data. the object storage system stores a plurality of indices for the plurality of objects, and where one of the plurality of indices stored by the object storage system corresponds to the index type. A request message indicating a request for the index data of the one of the plurality of indices stored by the object storage system is generated, and the request message is transmitted to the object storage system. The index data for the set of objects is received in a response message from the object storage system. The response message is transmitted to the edge node by the object storage system in response to receiving the request message. The index data includes a plurality of pairs that each include a key and a value. All of the keys of each pair in the index data corresponds to the index type. Each of the plurality of pairs corresponds to one of the set of objects. The value of each pair includes metadata of the one of the set of objects. The index data is stored in local memory in response to receiving the index data.

FIG. 11 presents an illustrative cloud computing environment 2050. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments, the DSN can be implemented by utilizing the cloud computing environment 2050 and/or can communicate with cloud computing environment 2050. Alternatively or in addition, the plurality of computing devices 12-16 of FIG. 1, the managing unit of FIG. 1, and/or the integrity processing unit 20 of FIG. 1, and/or storage units 36 can be implemented by utilizing cloud computing nodes 2010, personal digital assistant (PDA) or cellular telephone 2054A, desktop computer 2054B, laptop computer 2054C, and/or automobile computer system 2054N. In various embodiments, the cloud computing nodes 2010, personal digital assistant (PDA) or cellular telephone 2054A, desktop computer 2054B, laptop computer 2054C, and/or automobile computer system 2054N can communicate by utilizing network 24 of FIG. 1.

Figure 12:
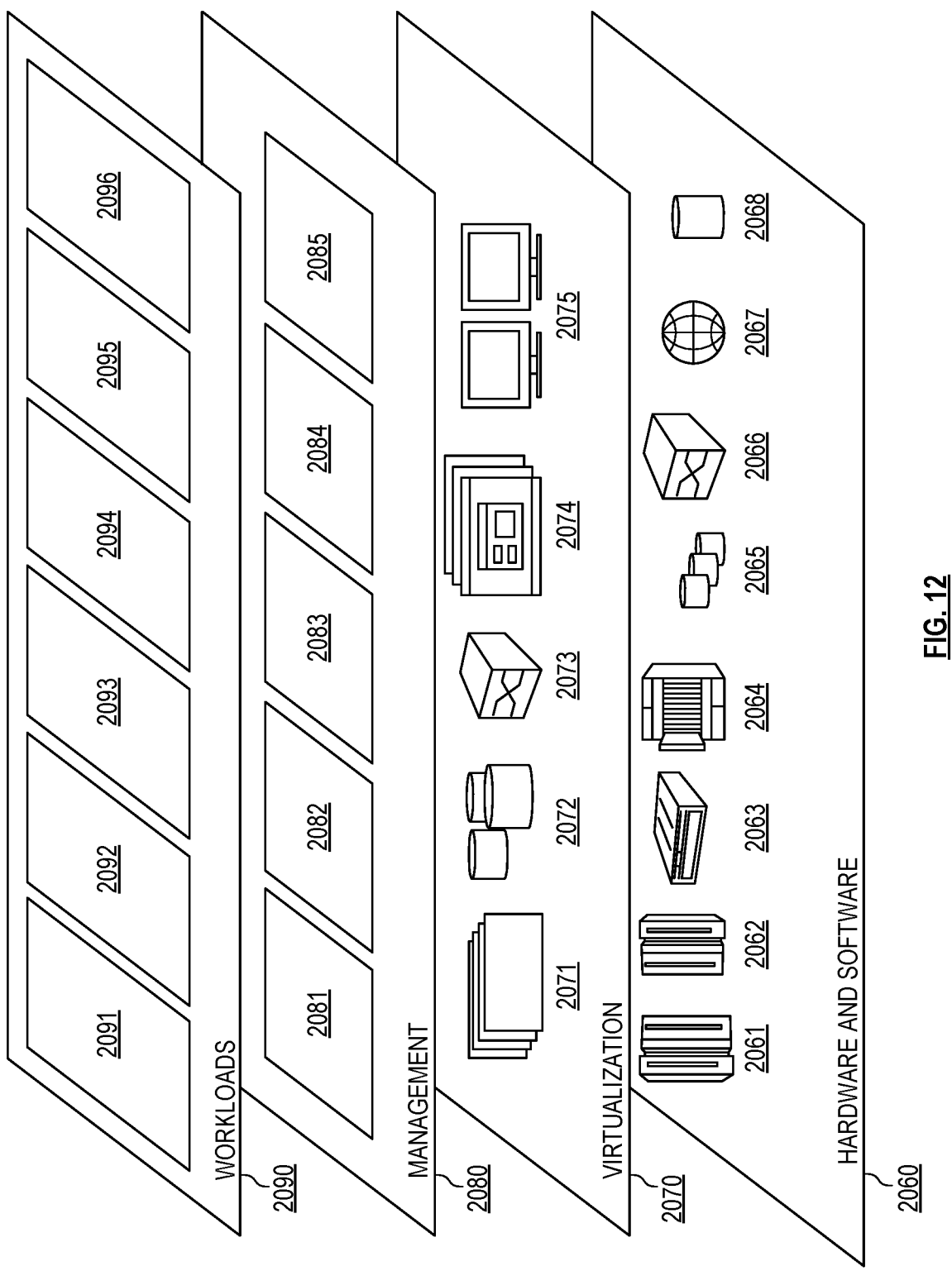
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068. In some embodiments, one or more hardware components can be implemented by utilizing the computing device 2300 of FIG. 13.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and index retrieval 2096.

In some embodiments, the DSN 10 can utilize utilizing the cloud computing environment 2050, for example, by utilizing the index retrieval 2096 of the workloads layer 2090 of FIG. 12 to perform index retrieval in the DSN, as described in conjunction with FIGS. 1-10, where some or all computing devices 12-16 of FIG. 1 and/or where one or more edge nodes 910 of FIGS. 9A, 9B, and 9D and/or are implemented by utilizing a cloud computing node 2010 and/or are otherwise operable to communicate with the object storage system 920 via a corresponding node 2010 of the cloud computing environment 2050. Alternatively or in addition, The object storage system of FIGS. 9A, 9B, and 9D can be implemented by utilizing the cloud computing environment 2050 and/or by utilizing a plurality of cloud computing node 2010. For example, the access layer 922 can be implemented by utilizing one or more corresponding cloud computing nodes 2010. Client device 960 of FIGS. 9B and 9D can be implemented by utilizing a computing device used by cloud consumers, such as, for example, personal digital assistant (PDA) or cellular telephone 2054A, desktop computer 2054B, laptop computer 2054C, and/or automobile computer system 2054N. Alternatively or in addition, the client device 960 can be coupled to and/or can communicate with an edge node 910 that is implemented utilizing a computing device used by cloud consumers, such as, for example, personal digital assistant (PDA) or cellular telephone 2054A, desktop computer 2054B, laptop computer 2054C, and/or automobile computer system 2054N.

Figure 13:
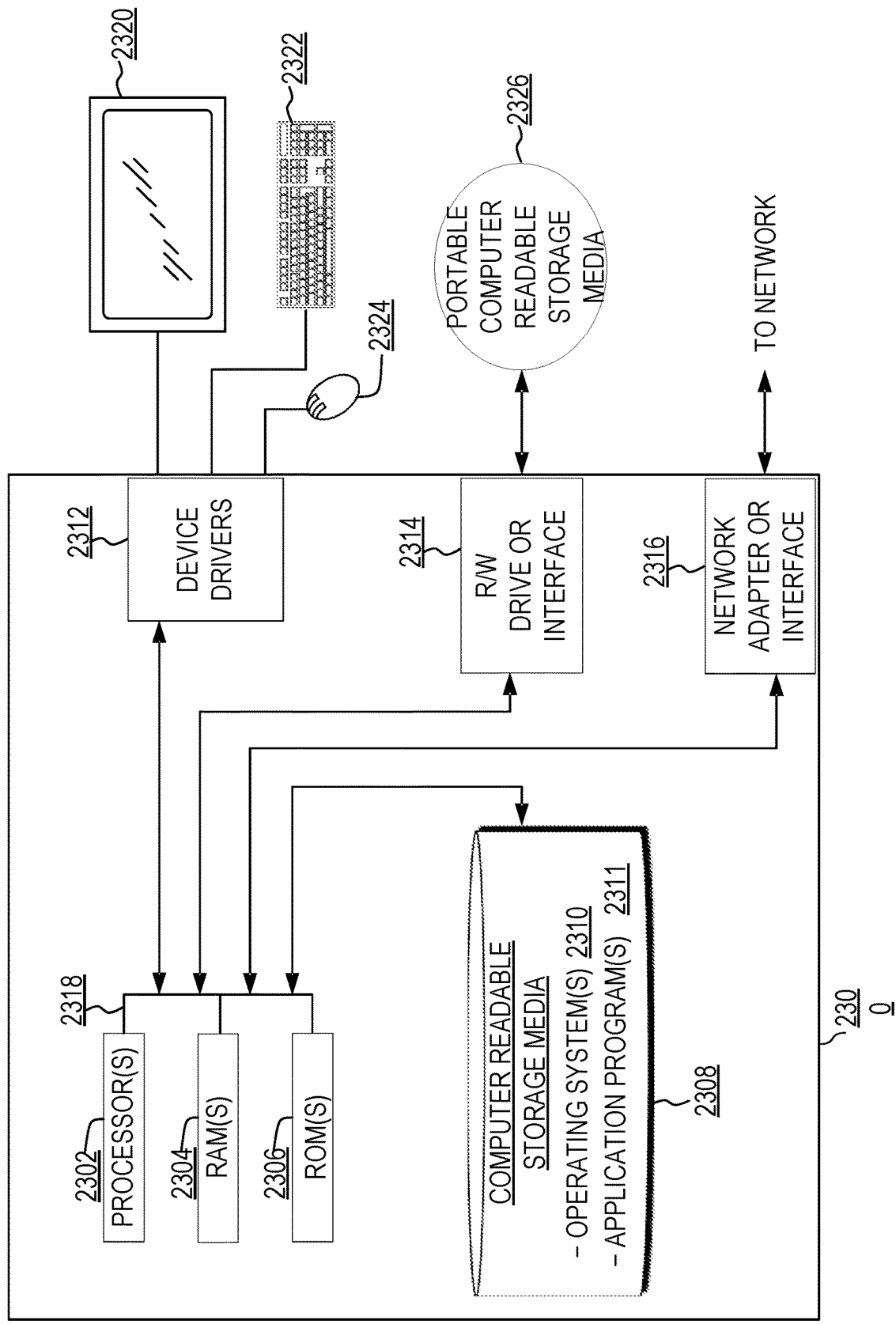
FIG. 13 depicts a block diagram of a computing device according to various embodiments of the present invention.

FIG. 13 depicts a block diagram of components of a computing device 2300, which can be utilized to implement some or all of the cloud computing nodes 2010, some or all of the computing devices 54A-N of FIG. 11, and/or to implement other computing devices described herein in accordance with an embodiment of the present invention. The computing device 2300 can be utilized to implement some or all of the plurality of computing devices 12-16 of FIG. 1, the DS client module 34 of FIG. 1, the managing unit of FIG. 1, the integrity processing unit 20 of FIG. 1, and/or storage units 36 of FIG. 1. For example the computing core 26 of FIG. 2 can be implemented by utilizing the computing device 2300. It should be appreciated that FIG. 13 provides only an illustration of one implementation and does not imply any limitations with regard to the environments in which different embodiments may be implemented. Many modifications to the depicted environment may be made.

Computing device 2300 can include one or more processors 2302, one or more computer-readable RAMs 2304, one or more computer-readable ROMs 2306, one or more computer readable storage media 2308, device drivers 2312, read/write drive or interface 2314, and network adapter or interface 2316, all interconnected over a communications fabric 2318. Communications fabric 2318 can be implemented with any architecture designed for passing data and/or control information between processors (such as microprocessors, communications and network processors, etc.), system memory, peripheral devices, and any other hardware components within the system.

One or more operating systems 2310 and/or application programs 2311, such as network application server software 2067 and database software 2068, are stored on one or more of the computer readable storage media 2308 for execution by one or more of the processors 2302 via one or more of the respective RAMs 2304 (which typically include cache memory). In the illustrated embodiment, each of the computer readable storage media 2308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 2300 can also include a R/W drive or interface 2314 to read from and write to one or more portable computer readable storage media 2326. Application programs 2311 on computing devices 2300 can be stored on one or more of the portable computer readable storage media 2326, read via the respective R/W drive or interface 2314 and loaded into the respective computer readable storage media 2308.

Computing device 2300 can also include a network adapter or interface 2316, such as a TCP/IP adapter card or wireless communication adapter. Application programs 2311 on computing devices 2054A-N can be downloaded to the computing device from an external computer or external storage device via a network (for example, the Internet, a local area network or other wide area networks or wireless networks) and network adapter or interface 2316. From the network adapter or interface 2316, the programs may be loaded into the computer readable storage media 2308. The network may comprise copper wires, optical fibers, wireless transmission, routers, firewalls, switches, gateway computers and edge servers.

Computing device 2300 can also include a display screen 2320, a keyboard or keypad 2322, and a computer mouse or touchpad 2324. Device drivers 2312 interface to display screen 2320 for imaging, to keyboard or keypad 2322, to computer mouse or touchpad 2324, and/or to display screen 2320 for pressure sensing of alphanumeric character entry and user selections. The device drivers 2312, R/W drive or interface 2314, and network adapter or interface 2316 can comprise hardware and software stored in computer readable storage media 2308 and/or ROM 2306.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by an edge node that includes a processor, the method comprises:
   determining by the edge node to retrieve index data for a set of objects of a plurality of objects stored by an object storage system;
   selecting an index type from a plurality of index types in response to determining to retrieve the index data, wherein the object storage system stores a plurality of indices for the plurality of objects, and wherein:
      one of the plurality of indices stored by the object storage system corresponds to the index type,
      in response to a request to retrieve a data object received from the edge node in communication over a network to the object storage system, the object storage system includes an access layer which stores encoded data slices for each index to an information dispersal algorithm (IDA) width threshold number of storage units in the object storage system,
      the access layer verifies credentials of the edge node, the access layer performs a dispersed storage error decoding function on retrieved encoded data slices to regenerate the requested data object and a requested index, and the access layer transmits the requested data object and the requested index to the edge node, generating a request message indicating a request for the index data of the one of the plurality of indices stored by the object storage system in response to determining that a time to live (TTL) of a currently stored index has elapsed and needs to be updated, and the currently stored index further includes inaccurate and out-of-date information;

transmitting the request message to the object storage system;

receiving the index data for the set of objects in a response message from the object storage system, wherein the response message is transmitted to the edge node by the object storage system in response to receiving the request message, wherein the index data includes a plurality of pairs that each include a key and a value, wherein all of the keys of each pair in the index data corresponds to the index type, wherein each of the plurality of pairs corresponds to one of the set of objects, and wherein the value of each pair includes metadata of the one of the set of objects and includes content of the one of the sets of objects; and storing the index data in local memory in response to receiving the index data.

2. The method of claim 1, wherein the request message includes a response cache control parameter, wherein a cache control header of the response message is set to include cache control data indicating a time period the edge node is to store the index data based on the cache control parameter, further comprising:

deleting the index data from the local memory in response to determining the time period has elapsed.

3. The method of claim 2, further comprising:

generating a second request message indicating a request for updated index data of the one of the plurality of indices stored by the object storage system in response to determining the time period has elapsed;

transmitting the second request message to the object storage system;

receiving the updated index data for the set of objects in a second response message from the object storage systems; and storing the updated index data in the local memory in response to receiving the updated index data.

4. The method of claim 1, further comprising:

determining filtering criteria for retrieval of the index data;

wherein the request message is generated to include the filtering criteria, wherein the index data received in the response message corresponds to a proper subset of pairs of the one of the plurality of indices stored by the object storage system, and wherein the proper subset is selected from the one of the plurality of indices by the object storage system based on the filtering criteria.

5. The method of claim 4, wherein the filtering criteria includes a namespace range, and wherein the proper subset of pairs of the one of the plurality of indices is selected by the object storage system to include only pairs of the one of the plurality of indices with keys that compare favorably to the namespace range.

6. The method of claim 4, wherein the filtering criteria indicates a time corresponding to a last modified since threshold, and wherein the proper subset of pairs of the one of the plurality of indices is selected by the object storage system to include only pairs of the one of the plurality of indices with values indicating a last modified time that is more recent than the time.

7. The method of claim 4, wherein the filtering criteria includes a last unmodified since threshold, and wherein the proper subset of pairs of the one of the plurality of indices is selected by the object storage system to include only pairs of the one of the plurality of indices with values indicating a last modified time that is less recent than the time.

8. The method of claim 1, wherein the one of the plurality of indices is one of: a first one of the plurality of indices or a second one of the plurality of indices, wherein a first pair for one of the plurality of objects is included in the first one of the plurality of indices, wherein a second pair for the one of the plurality of indices is included in the second one of the plurality of indices, wherein the value of the first pair includes a first subset of a plurality of metadata for the one of the plurality of objects, wherein the value of the second pair includes a second subset of the plurality of metadata for the one of the plurality of objects, and wherein a set difference between the first subset and the second subset is non-null.

9. The method of claim 8, wherein the one of the plurality of indices is the first one of the plurality of indices, further comprising:

determining to retrieve second index data for a second set of objects of the plurality of objects stored by the object storage system, wherein an intersection between the second set of objects and the first set of objects includes the one of the plurality of objects; and selecting a second index type from the plurality of index types in response to determining to retrieve the second index data for the second set of objects, wherein the second one of the plurality of indices stored by the object storage system corresponds to the second index type;

wherein the request message further indicates a request for the second index data of the second one of the plurality of indices stored by the object storage system, and wherein the second index data is received for the set of objects in the response message from the object storage system includes index data of the first one of the plurality of indices, further comprising:

storing the second index data in the local memory in response to receiving the second index data.

10. The method of claim 8, wherein an index type of the second one of the plurality of indices corresponds to one metadata field of the first subset of the plurality of metadata, wherein one metadata field of the first subset of the plurality of metadata is included in the set difference, wherein a metadata value of the one metadata field in the first subset of the plurality of metadata is a first one of a plurality of possible metadata values for the one metadata field, wherein all of the keys of each pair in the second one of the plurality of indices indicates a corresponding one of the plurality of possible metadata values for the one metadata field, and wherein the key of the second pair indicates the first one of a plurality of possible metadata values for the one metadata field.

11. The method of claim 8, wherein a first index type of the first one of the plurality of indices corresponds to a name index, wherein a second index type of the second one of the plurality of indices corresponds to an object type index, wherein the key of the first pair corresponds to a name of the one of the plurality of objects, and wherein the key of the second pair corresponds to an object type of the one of the plurality of objects.

12. The method of claim 11, wherein a plurality of object types includes an audio file type, a video file type, and an image file type, and wherein the key of each pair in the second one of the plurality of indices indicates one of the plurality of object types.

13. The method of claim 11, wherein a third index type of a third one of the plurality of indices corresponds to an artist name type, wherein each pair in the third one of the plurality of indices corresponds to an audio file, wherein the key of each pair in the third one of the plurality of indices indicates one of a plurality of artists of the audio file, and wherein:
the access layer retrieves at least an IDA decode threshold number of encoded data slices of each data segment of a stored data object and a stored index from at least a corresponding IDA decode threshold number of storage units of the object storage system in response to a request to retrieve the data object received from the edge node, and
the object storage system evaluates the index request message and generates an index indicated in the index request message.

14. The method of claim 1, further comprising:
generating statistical analysis data by performing at least one analysis algorithm on the index data; and
facilitating display of the statistical analysis data via a graphical user interface on a display device of a client device associated with the edge node.

15. A processing system of an edge node comprises:
at least one processor;
a memory that stores operational instructions, that when executed by the at least one processor cause the processing system to:
determine to retrieve index data for a set of objects of a plurality of objects stored by an object storage system;
the set of objects in a response message from the object storage system, wherein the response message is transmitted to the edge node by the object storage system in response to receiving the request message, wherein the index data includes a plurality of pairs that each include a key and a value, wherein all of the keys of each pair in the index data corresponds to the index type, wherein each of the plurality of pairs corresponds to one of the set of objects, and wherein the value of each pair includes metadata of the one
select an index type from a plurality of index types in response to determining to retrieve the index data, wherein the object storage system stores a plurality of indices for the plurality of objects, and wherein one of the plurality of indices stored by the object storage system corresponds to the index type;
generate a request message indicating a request for the index data of the one of the plurality of indices stored by the object storage system in response to receiving a data analysis request from a client device via a network based on user input to a graphical user interface displayed on a display device of the client device, wherein the data analysis request includes a request for a particular analysis and one or more full and partial indices;
transmit the request message to the object storage system;
receive the index data for of the set of objects and includes content of the one of the sets of objects; and
store the index data in local memory in response to receiving the index data wherein:
in response to a request to retrieve a data object received from the edge node in communication over a network to the object storage system, the object storage system includes an access layer which stores encoded data slices for each index to an information dispersal algorithm (IDA) width threshold number of storage units in the object storage system,
the access layer verifies credentials of the edge node,
the access layer performs a dispersed storage error decoding function on retrieved encoded data slices to regenerate the requested data object and a requested index, and
the access layer transmits the requested data object and the requested index to the edge node.

16. The processing system of claim 15, wherein the request message includes a response cache control parameter, wherein a cache control header of the response message is set to include cache control data indicating a time period the edge node is to store the index data based on the cache control parameter, and wherein the operational instructions, when executed by the at least one processor cause, further the processing system to:
delete the index data from the local memory in response to determining the time period has elapsed.

17. The processing system of claim 15, wherein the operational instructions, when executed by the at least one processor cause, further the processing system to:
determine filtering criteria for retrieval of the index data;
wherein the request message is generated to include the filtering criteria, wherein the index data received in the response message corresponds to a proper subset of pairs of the one of the plurality of indices stored by the object storage system, and wherein the proper subset is selected from the one of the plurality of indices by the object storage system based on the filtering criteria.

18. The processing system of claim 15, wherein the one of the plurality of indices is one of: a first one of the plurality of indices or a second one of the plurality of indices, wherein a first pair for one of the plurality of objects is included in the first one of the plurality of indices, wherein a second pair for the one of the plurality of objects is included in the second one of the plurality of indices, wherein the value of the first pair includes a first subset of a plurality of metadata for the one of the plurality of objects, wherein the value of the second pair includes a second subset of the plurality of metadata for the one of the plurality of objects, and wherein a set difference between the first subset and the second subset is non-null.

19. The processing system of claim 15, wherein the one of the plurality of indices is the first one of the plurality of indices, and wherein the operational instructions, when executed by the at least one processor cause, further the processing system to:
generate statistical analysis data by performing at least one analysis algorithm on the index data; and
facilitate display of the statistical analysis data via a graphical user interface on a display device of a client device associated with the edge node.

20. A non-transitory computer readable storage medium comprises:
at least one memory section that stores operational instructions that, when executed by a processing system of a dispersed storage network (DSN) that includes a processor and a memory, causes the processing system to:

determine to retrieve index data for a set of objects of a plurality of objects stored by an object storage system;

select an index type from a plurality of index types in response to determining to retrieve the index data, wherein the object storage system stores a plurality of indices for the plurality of objects, and wherein one of the plurality of indices stored by the object storage system corresponds to the index type;

generate a request message indicating a request for the index data of the one of the plurality of indices stored by the object storage system in response to determining that a time to live (TTL) of a corresponding currently stored index has elapsed and needs to be updated, and the currently stored index further includes inaccurate and out-of-date information;

transmit the request message to the object storage system;

receive the index data for the set of objects in a response message from the object storage system, wherein the response message is transmitted to the edge node by the object storage system in response to receiving the request message, wherein the index data includes a plurality of pairs that each include a key and a value, wherein all of the keys of each pair in the index data corresponds to the index type, wherein each of the plurality of pairs corresponds to one of the set of objects, and wherein the value of each pair includes metadata of the one of the set of objects and includes content of the one of the sets of objects; and store the index data in local memory in response to receiving the index data wherein:
  in response to a request to retrieve a data object received from the edge node in communication over a network to the object storage system, the object storage system includes an access layer which stores encoded data slices for each index to an information dispersal algorithm (IDA) width threshold number of storage units in the object storage system,
  the access layer verifies credentials of the edge node,
  the access layer performs a dispersed storage error decoding function on retrieved encoded data slices to regenerate the requested data object and a requested index, and
  the access layer transmits the requested data object and the requested index to the edge node.

* * * * *